A. FISCHER.
Beer Cooler.

No. 53,285.  Patented Mar. 20, 1866.

Witnesses:

Inventor:

United States Patent Office.

ADALBERT FISCHER, OF NEW YORK, N. Y.

IMPROVED APPARATUS FOR COOLING BEER, &c.

Specification forming part of Letters Patent No. 53,285, dated March 20, 1866.

*To all whom it may concern:*

Be it known that I, ADALBERT FISCHER, of the city, county, and State of New York, have invented a new and Improved Liquid-Cooler; and I do hereby declare that the following is a full, clear, and exact description thereof, which will enable those skilled in the art to make and use the same, reference being had to the accompanying drawings, forming part of this specification, in which—

Figure 1:
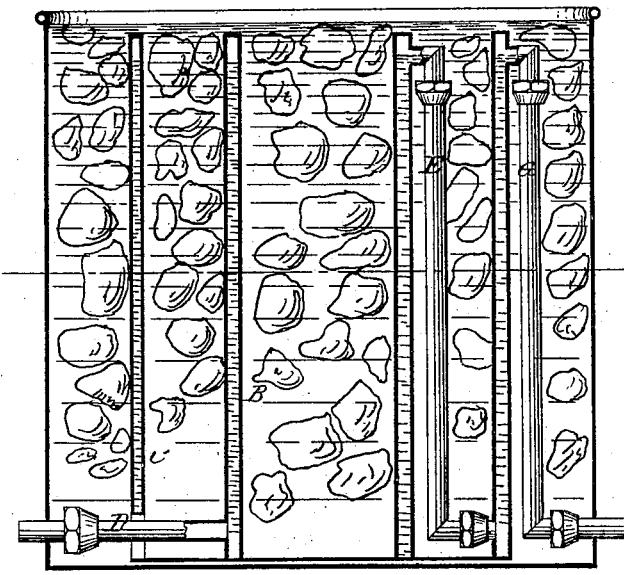
Figure 2:
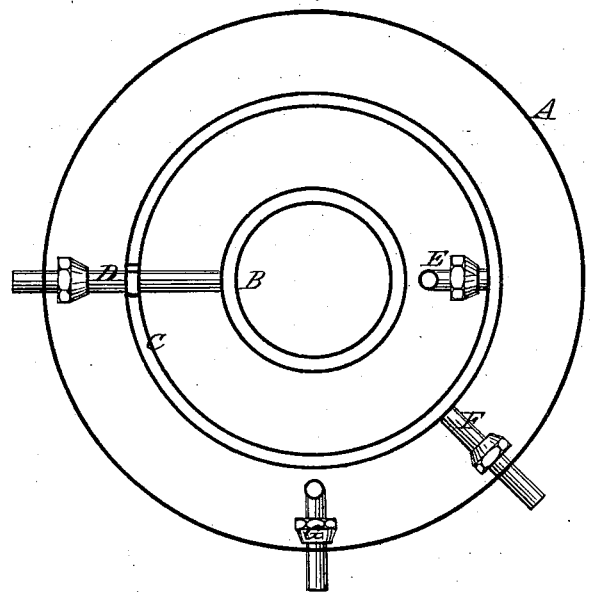

Figure 1 represents a vertical central section of this invention. Fig. 2 is a horizontal section of the same.

Similar letters of reference indicate corresponding parts.

This invention relates to a cooler for beer and other liquids, composed, principally, of two or more annular cylinders of gradually-increasing diameter, placed one within the other, in combination with suitable connecting-pipes and with a vat or tank, in such a manner that by filling the tank with water and ice, beer or other liquid passed through said annular cylinders can be cooled with little expense and to any desired degree. The pipes which connect the annular cylinders are so arranged that they can be readily unscrewed and the cylinders can be removed for the purpose of cleaning.

A represents a vat or tank, made of galvanized iron, or of wood, or any other suitable material. In this tank are placed two or more annular cylinders, B C, of gradually-increasing diameter, so that spaces are left between the walls of the several cylinders for water and ice.

The space between the two walls of the inner cylinder, B, communicates at its bottom with the supply-pipe D, and from its top emanates a pipe, E, which extends down and passes through in the bottom of the next cylinder, C, and so on until a pipe, F, from the top of the last cylinder serves to discharge the liquid that is to be cooled.

The annular spaces between the two walls of each cylinder are very narrow, and said cylinders are made of copper, galvanized iron, or other good conductor of heat, so that a very extensive cooling-surface is obtained.

The beer or other liquid to be cooled is passed through the pipe D to the inner cylinder, thence through the pipe E to the next, and so on until it is allowed to discharge through the pipe G.

The spaces around and between the several cylinders are filled with cold water and ice, and the beer is cooled in a short time and with a comparatively small expenditure of ice, which, being in immediate contact with the inner and outer surfaces of the cylinders B C, produces a much greater cooling effect than it does if allowed to melt in water, which, after the ice has melted, is applied to the cooler.

The pipes D F G are arranged with union couplings, so that they can be readily taken apart whenever it is desired to remove the cylinders for the purpose of cleaning, and a pipe, F, serves to draw off the contents of the cylinder C whenever it may be desirable.

What I claim, and desire to secure by Letters Patent, is—

The combination and arrangement of the series of annular cylinders B C, connecting-pipes D E G, and tank A, as and for the purpose specified.

The above specification of my invention signed by me this 18th day of September, 1865.

ADALBERT FISCHER.

Witnesses:
    M. M. LIVINGSTON,
    C. L. TOPLIFF.